Dec. 1, 1931.    J. J. VIENNEAU    1,834,811
COIL WINDING APPARATUS
Filed Dec. 17, 1929
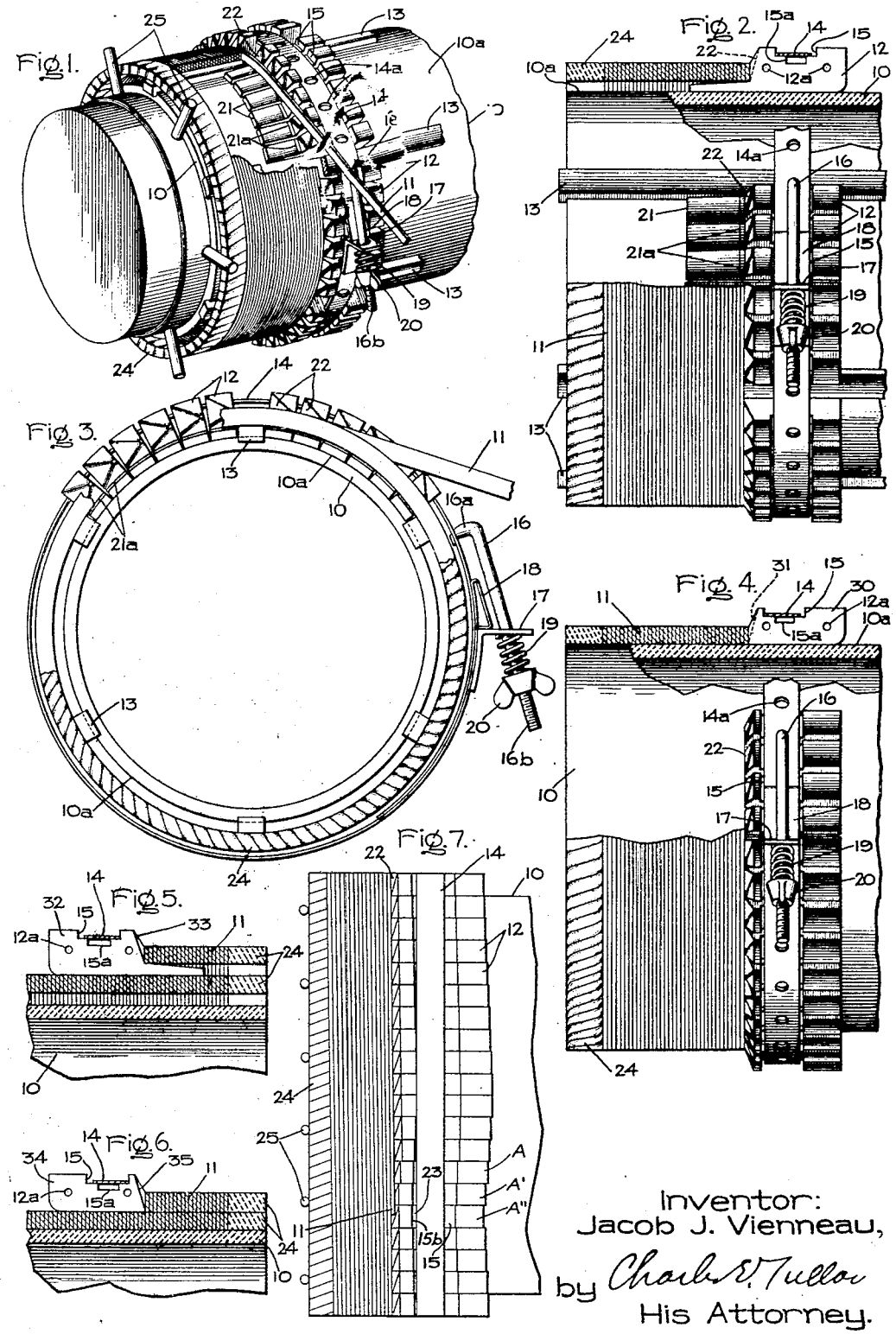
Inventor:
Jacob J. Vienneau,
by Charles E. Tullar
His Attorney.

Patented Dec. 1, 1931

1,834,811

UNITED STATES PATENT OFFICE

JACOB J. VIENNEAU, OF PITTSFIELD, MASSACHUSETTS, ASSIGNOR TO GENERAL ELECTRIC COMPANY, A CORPORATION OF NEW YORK

COIL-WINDING APPARATUS

Application filed December 17, 1929. Serial No. 414,780.

My invention relates to apparatus for winding electrical conductors and the like into coils, and has for its object the provision of improved apparatus of this character.

Although obviously it is not limited thereto, my invention is particularly useful in connection with apparatus for winding transformer coils and the like wherein passageways are provided for conducting a cooling medium through the winding.

In one of its aspects my invention contemplates the provision of improved apparatus for winding electrical coils of this character, and also the provision of means for compacting the turns as the coil is being wound.

In carrying out my invention on one form thereof I provide means for supporting the conductor as it is being wound so that a layer of turns will be formed in spaced relation with the preceding winding surface, which surface may be either the winding surface of the spool or a previously wound layer. I further provide suitable means for supporting the spaced layer in its wound position after it has been wound so that a passageway will be provided in the finished winding.

In order to compact the turns, I provide means for applying an axial pressure to the conductor as it is wound on.

For a more complete understanding of my invention, reference should be had to the accompanying drawings in which Fig. 1 is a perspective view of apparatus for winding coils embodying my invention illustrating a layer being wound from left to right in spaced relation with the spool; Fig. 2 is an elevation partly in section of the apparatus shown in Fig. 1; Fig. 3 is an end elevation of the apparatus shown in Fig. 1; Fig. 4 is a fragmentary view partly in section of apparatus for winding coils in accordance with my invention illustrating a layer being wound from left to right directly on the spool surface; Fig. 5 is a fragmentary view illustrating a layer being wound from right to left in spaced relation with a previously wound layer; Fig. 6 is a view similar to Fig. 5 but illustrating a layer being wound directly on a previously wound layer; and Fig. 7 is a diagrammatic view illustrating the manner in which the conductor is wound on.

Referring to the drawings, I have shown my invention in one form in connection with apparatus for winding transformer coils which are provided with passageways or ducts, the passageways being formed by winding a layer of turns in spaced relation with the previous winding surface. This winding surface obviously may be the winding surface of the spool (Figs. 1, 2 and 3), or the surface of the previously wound layer (Fig. 5).

Referring more particularly to Figs. 1–3 inclusive, the winding spool 10 on which the coil is to be wound is mounted on a suitable winding arbor (not shown). It will be understood that the arbor will be operated to rotate the spool by any suitable source of power, and further that the electrical conductor 11 will be fed to the spool by a suitable distributor (not shown) so that as the spool is rotated the conductor will be wound on helically in a plurality of layers. It will be understood, however, that each turn may be wound if desired on a circumference rather than on a helix.

In order to form the ducts or passageways through the winding, I wind a layer of turns in spaced relation with the preceding winding surface which, as schown in Figs. 1–3, is the winding surface 10a of the spool 10. To this end, I provide means for supporting the conductor as it is being wound on so that the turns of the layer are successively formed in spaced relation with the winding surface, and further, I provide means for supporting the wound turns of the layer in their spaced positions.

I provide a plurality of supporting members 12 for supporting the conductor as it is wound on. Preferably the supports will be formed from machine steel. As shown, these members will be positioned on the winding surface 10a in groups about the periphery of the surface so as to form substantially a complete circle. However, the groups are spaced sufficiently to receive between them longitudinal layer supporting members 13, which as shown, are of strip-like form. The members 13 will be formed preferably from a suitable insulating material such as pressboard.

The supports 12 are secured on the winding surface 10a by means of a comparatively light flexible band 14, which preferably will be formed from a suitable metal such as spring steel. Each support 12 is provided with a recess 15 in its outer surface so that the recesses 15 of the supports taken together provide a passageway for the strip 14 substantially concentric with the winding surface. I secure the ends of this band by means of a suitable resilient connection which tends to draw the ends together. This resilient connection comprises a hook member 16, the hooked end 16a of which is passed through one of a number of apertures 14a provided in one end portion of the band, while the other end 16b is passed through an apertured angle iron 17 secured to the other end portion of the band. Each recess 15 is provided in its bottom with a recess 15a positioned to accommodate the end of the hook 16a. The angle iron 17 preferably is welded to its end of the band and is further secured by means of an abutment or ledge 18. This abutment may be provided conveniently by turning the end portion of the strip back on itself and then inward toward the body of the band so that the bent end portion together with the body portion forms a triangle as is clearly shown in Fig. 3. The tension in the band is provided by a compression spring 19 which is mounted between the angle member 17 and a suitable nut 20 screwed on the threaded end 16b of the hook member. It will be understood that any suitable tension, within wide limits, may be secured by adjusting the nut on the threaded portion. It will be observed that the band 14 is comparatively long and is provided with a number of apertures 14a. This arrangement provides for the increase in the diameter of the coil as the successive layers are wound on.

Each conductor supporting member 12 is provided with a supporting portion 21 (Figs. 1 and 2) which when the member is positioned on the winding surface projects from the rearward or trailing end of the member axially of the coil. It will be observed that these portions 21 taken together provide a substantially uninterrupted second winding surface 21a for the conductor arranged substantially concentric with the preceding winding surface which, as has been pointed out, in this case is the winding surface 10a of the spool. Therefore, if the conductor be wound on this second winding surface, i. e., the winding surface formed by the supporting portions 21, a turn will be formed in spaced relation and substantially concentric with the winding surface of the spool. It will be observed that in order to form the successive turns of the layer in spaced relation with the spool, it is but necessary to advance the second winding surface axially of the coil as the conductor is being wound on.

Preferably, the supports 12 will be advanced axially of the coil as the conductor is wound on by means of the conductor itself. As shown, each support is provided with an inclined surface 22, which when the support is in its working position on the preceding winding surface 10a, is positioned so that it engages the outer side of the conductor, i. e., the side at the end of the layer portion which is being wound. By reason of this arrangement, the supports 12 forming the second winding surface will be successively advanced axially of the coil by means of the wedging action of the conductor against the inclined surface portions 22.

The axial motion imparted to the supports will be readily understood by reference to Fig. 7. As shown in this figure a number of turns have been completed and another turn has been partially completed. It will be observed that the conductor, while it engages the inclined surfaces 22 successively as it is being wound on, will be acting on several of the supports A, A' and A" at the same time. It will also be observed that the retaining band 14 will be gradually advanced axially of the coil as the turn is being wound on so that when the side of the conductor is engaging the inclined surface 22 of a support, as for example, that designated by the letter "A", there will be an appreciable clearance 23 between the bend and the trailing end 15b of the recess 15. In other words these supports will be advanced axially of the coil a distance equivalent to the width of the conductor as each turn is formed. During the initial portion of this movement the clearance 23 will be reduced until finally the trailing end of the recess will engage the band and the band in consequence will be advanced. By reason of the fact that the conductor engages the several supports A, A' and A" successively, it will be readily understood that they will successively engage the retaining band 14. In like manner the other supports 12 will be advanced. Thus the retaining band will be gradually and positively advanced axially of the coil.

As the second winding surface 21a formed by the members 12 is thus advanced axially of the coil, it will be moved away from the turns which have been wound, but these turns will be supported in their spaced positions by means of the peripherally spaced supporting members 13. It will be understood that the conductor will support itself between the supporting members 13.

The members 12 also function to apply an axial pressure to the conductor as it is wound on so that the turns of the finished coil are compacted. It will be observed that the supports are forced into frictional engagement with the winding surface 10a of the spool by reason of the resilient connection provided between the ends of the retaining band 14. Thus, the axial motion imparted to the supports by the conductor is resisted by the frictional forces between the lower surfaces of the supports and the winding surface of the spool. In other words, these frictional forces oppose the wedging of the conductor between the last wound turn of the layer being wound and the inclined surfaces 22. These frictional forces of course may be increased or decreased by turning the nut 20 inwardly or outwardly on the threaded end portion 16b of the securing hook member 16.

Preferably, and as shown, each end turn of the coil will be provided with a suitable layer of insulation 24 which will be formed from any suitable material, such as pressboard, and will be secured to the end turn in any suitable manner such as by taping. The end turns will be secured against displacement from the ends of the winding surfaces by means of radially projecting pin-like members 25. As shown (Fig. 1), these pins are spaced at suitable intervals about the periphery of the spool 10.

In using the apparatus, the supporting members 13 will be secured longitudinally on the winding surface of the spool spaced at suitable intervals. These members 13 may be secured in any suitable manner, as for example, by taping them to the winding surface. If the first layer is to be wound from left to right, as shown in Figs. 1 and 2, the supporting members 12 will be arranged in groups between the members 13 at the left-hand end of the spool. These members may be secured on the spool for assembly with the tension band by means of wires which will be passed through apertures 12a provided in the supporting members. The groups may be placed on the periphery of the surface 10a progressively and the first turn will be wound on as the groups are progressively formed. In other words, a portion of the first turn equivalent to the distance between one pair of supports 13 will be wound. Then a group of supports 12 will be positioned between these members 13 with their portions 21 under the conductor. Then another portion of the conductor of like length will be wound and another group of supports positioned on the winding surface. In like manner the remaining portion of the first turn will be wound and the remaining groups of supports mounted on the winding surface. The tension and securing band 14 will then be wrapped about the supporting members and its ends will be secured by the hook member 16, after which the wires which were employed to hold the supporting members may be withdrawn or removed. The conductor 11 will then be fed to the spool from a suitable reel (not shown) as the spool 10 is rotated. As the layer is being wound the supporting members 12 will be successively advanced as has been described so that the succeeding turns of the layer will be wound in spaced relation with respect to the winding surface 10a of the spool. As has been described, these turns will be secured or supported in their spaced positions by means of the longitudinal supporting members 13.

If it had been desired to wind the first layer directly on the winding surface rather than in spaced relation with it, suitable members 30 (Fig. 4) would have been used rather than the supporting members 12. These members function only to compact the turns as they are wound on. As shown, each member 30 is provided with a suitable inclined surface 31 for engaging the side of the conductor as it is wound on so that the turns will be compacted as they are formed. The method of mounting these members on the winding surface 10a is identical with the method of mounting the members 12; and the action of the conductor in successively advancing these members axially of the coil is the same as that described in connection with the members 12.

The second layer will, of course, be wound from right to left on the coil. If the second layer is to be wound in spaced relation with respect to the first layer, supporting members 32 (Fig. 5) will be provided to support the turns of the second layer as they are formed. It will be understood in this case that longitudinal supporting members similar to the members 13 will have been secured to the outer surface of the first layer so as to provide permanent supports for the second layer. Each member 32 is provided with a suitably inclined surface 33 for engaging the side of the conductor as it is wound on so that the turns of the second layer will be compacted as they are formed.

If the second layer is to be wound directly on the first layer rather in spaced relation with the first layer, suitable members 34 (Fig. 6) which functions only to compact the turns will be provided. These members in construction are identical with the compacting members of Fig. 4, with the exception of the arrangement of the inclined surface 35, which of course will be appropriately located so as to engage the side of the conductor as it is wound on.

It will be understood that any suitable number of layers may be wound. Those to be spaced will be formed by using either the supports 12 (Figs. 1 and 2) or the supports 32 (Fig. 5), the choice depending on whether a left to right or a right to left turn is being formed. Those layers which are wound directly on the preceding winding surface will be compacted by the appropriate members 30 (Fig. 4) or 34 (Fig. 6).

What I claim as new and desire to secure by Letters Patent of the United States is:

1. Coil-winding apparatus for electrical conductors and the like comprising a winding form on which said conductor is wound in layers, means for supporting said conductor as it is being wound into a layer so as to space the turns of said layer with relation to the preceding winding surface, and means for supporting said layer in said spaced position after it has been wound.

2. The combination with apparatus for winding electrical conductors and the like to form a coil, of means for winding one of said layers in spaced relation with the preceding layer comprising means for supporting said conductor as it is being wound so that the turns of said one layer are wound in spaced relation with said preceding layer, and means for supporting said wound layer in its spaced position.

3. Coil-winding apparatus for electrical conductors and the like comprising a winding form on which said conductor is wound in a plurality of layers, and means for spacing one of said layers from the preceding winding surface comprising a second winding surface for said conductor arranged substantially concentrically with said first winding surface, said winding surfaces being relatively movable axially of the coil as said conductor is wound on so that each turn of said layer is wound in spaced relation with said first winding surface.

4. Coil-winding apparatus for electrical conductors and the like comprising a winding form on which said conductor is wound in a plurality of layers, and means for spacing one of said layers from the preceding winding surface so as to provide a passageway through the winding comprising a plurality of members for supporting said conductor as it is being wound to form a turn so that the turn is wound in spaced relation with said winding surface, said members being relatively movable axially of the winding form so as to be relatively displaced as the turns are wound on whereby the succeeding turns of said layer are spaced from said winding surface.

5. The combination with a winding machine for electrical conductors and the like provided with a winding spool and means for rotating said spool and for feeding said conductor to said spool so that it is wound into a plurality of layers, of means for spacing one of said layers from the preceding winding surface so as to form a passageway through said winding comprising a plurality of members positioned on said winding surface for supporting said conductor as it is being wound to form said layer so that the turns thereof are wound in spaced relation with said winding surface, said supporting members being relatively movable axially of said spool body so as to be displaced by said conductor as it is being wound on, means for resisting the relative motion of said supporting members and said spool body by said conductor whereby said turns are compacted axially as they are being wound on, and a plurality of members positioned between said winding surface and said spaced layer for maintaining the layer in its spaced position.

6. The combination with a winding machine for electrical conductors and the like provided with a winding spool and means for rotating said spool and for feeding said conductor to said spool so that it is wound into a plurality of layers, of means for spacing one of said layers from the preceding winding surface so as to form a passageway through said winding comprising a plurality of members for supporting said conductor as it is being wound to form a turn of said layer mounted for axial movement on said winding surface and being positioned about its periphery, each of said supporting members being provided with an inclined surface positioned so as to engage a side of the conductor as it is being wound on whereby said supports are successively advanced axially of the spool to space the succeeding turns of said layer from said winding surface as they are being wound on, and means positioned between said layer and said winding surface for supporting the wound turns as said supporting members are advanced axially of said winding surface.

7. The combination with a winding machine for electrical conductors and the like provided with a winding spool and means for rotating said spool and for feeding said conductor to said spool so that it is wound into a plurality of layers, of means for spacing one of said layers from the preceding winding surface so as to form a passageway through said winding comprising a plurality of members for supporting said conductor as it is being wound to form a turn of said layer mounted for axial movement on said winding surface and being positioned about its periphery, each of said supporting members being provided with an inclined surface positioned so as to engage a side of the conductor as it is being wound on whereby said supports are successively advanced axially of the spool to space the succeeding turns of said layer from said winding surface as they are being wound on, means positioned between said layer and said winding surface for supporting the wound turns as said supporting members are advanced axially of said winding surface, and means for forcing said supporting members to frictionally engage said winding surface so that said members apply an axial pressure to said conductor as it is being wound on.

8. The combination with a winding machine for electrical conductors and the like provided with a winding spool and means for rotating said spool and for feeding said conductor to said spool so that it is wound into a plurality of layers, of means for spacing one of said layers from the preceding winding surface so as to form a passageway through said winding comprising a plurality of supports on said winding surface arranged in groups which when taken together substantially form a ring surrounding said winding surface, each support being provided with a supporting arm arranged axially of said surface so that as the conductor is being wound on it will be supported by the successive arms of said supports to form a turn spaced from said winding surface, and each being provided with an inclined surface positioned so as to engage a side of the conductor as it is being wound on whereby said supports are successively advanced axially of the spool to space the succeeding turns of said layer from said winding surface as they are wound on, a plurality of longitudinal members on said winding surface between said groups of supports for supporting the wound turns as said supports are advanced axially of said winding surface, a band embracing said supports, and resilient means tending to draw the ends of said band together whereby said supports are forced into frictional engagement with said winding surface so that said supports apply an axial pressure to said conductor as it is being wound on.

9. Coil-winding apparatus for electrical conductors and the like comprising a spool on which said conductor is wound in layers, and means for applying a pressure to said conductor to compact the turns axially as they are wound on comprising a member mounted on the winding surface so as to be relatively movable axially of said spool and to be displaced by said conductor as it is being wound on, and means for resisting the relative motion of said member and said spool by said conductors.

10. Coil-winding apparatus for electrical conductors and the like comprising a spool on which said conductor is wound in layers, means for applying a pressure to said conductor to compact the turns axially as they are wound on, comprising a plurality of members mounted on the winding surface about its periphery, each of said members being provided with an inclined surface and being positioned on said winding surface so that said inclined surface engages a side of the conductor as it is being wound on, whereby said members are successively advanced axially of the spool, and means for forcing said members to frictionally engage the winding surface so that said members apply an axial pressure to said conductor as it is wound on.

In witness whereof, I have hereunto set my hand this 12th day of Dec., 1929.

JACOB J. VIENNEAU.

DISCLAIMER 1,834,811.—*Jacob J. Vienneau*, Pittsfield, Mass. COIL-WINDING APPARATUS. Patent dated December 1, 1931. Disclaimer filed January 22, 1932, by the assignee, *General Electric Company*.

Hereby disclaims:

"1. The subject matter of claim 1 except when the layer supporting means called for in said claim is on the preceding winding surface referred to in said claim.

"2. The subject matter of claim 2 except when the layer supporting means called for in said claim comprises members arranged at spaced intervals beneath the wound layer referred to in said claim.

"3. The subject matter of claim 3 except when the coil winding apparatus thereof comprises members spaced at intervals on the first winding surface called for in said claim for supporting the layer referred to in said claim after it has been wound."

[*Official Gazette March 1, 1932.*]